US006864608B2

(12) United States Patent
Kang et al.

(10) Patent No.: US 6,864,608 B2
(45) Date of Patent: Mar. 8, 2005

(54) BRUSHLESS GENERATOR WITH PERMANENT MAGNETS

(75) Inventors: Do Hyun Kang, Changwon-si (KR); Yeon Ho Jeong, Changwon-si (KR)

(73) Assignee: Korea Electrotechnology Research Institute, Kyungsangnam-do (KR)

( * ) Notice: Subject to any disclaimer, the term of this patent is extended or adjusted under 35 U.S.C. 154(b) by 0 days.

(21) Appl. No.: 10/207,873

(22) Filed: Jul. 31, 2002

(65) Prior Publication Data

US 2003/0025418 A1 Feb. 6, 2003

(51) Int. Cl.[7] .................. H02K 21/26; H02K 21/38; H02P 9/14
(52) U.S. Cl. ................. 310/154.02; 310/154.01; 310/181; 322/46
(58) Field of Search .............. 310/154.32, 154.06, 310/154.35, 154.36, 154.01, 154.02, 154.03, 154.48, 154.47, 181, 154.11, 154.17, 168; 322/46, 45, 28, 99

(56) References Cited

U.S. PATENT DOCUMENTS

| | | | | |
|---|---|---|---|---|
| 1,862,427 A | * | 6/1932 | Riccia | 323/203 |
| 4,210,836 A | * | 7/1980 | Kouba | 310/112 |
| 4,229,689 A | * | 10/1980 | Nickoladze | 322/32 |
| 4,663,536 A | * | 5/1987 | Roesel et al. | 290/7 |
| 4,713,570 A | * | 12/1987 | Mastromattei | 310/181 |
| 4,782,272 A | * | 11/1988 | Buckley et al. | 318/254 |
| 4,843,270 A | * | 6/1989 | Dijken | 310/208 |
| 4,959,605 A | * | 9/1990 | Vaidya et al. | 322/10 |
| 4,965,477 A | * | 10/1990 | Stadler et al. | 310/114 |
| 4,982,123 A | * | 1/1991 | Raad | 310/68 D |
| 5,039,932 A | * | 8/1991 | Belanger et al. | 322/32 |
| 5,059,884 A | * | 10/1991 | Shah et al. | 318/701 |
| 5,672,925 A | * | 9/1997 | Lipo et al. | 310/154.11 |
| 5,773,903 A | * | 6/1998 | McCabria et al. | 310/68 D |
| 5,825,113 A | * | 10/1998 | Lipo et al. | 310/181 |
| 5,850,138 A | * | 12/1998 | Adams et al. | 322/68 |
| 5,955,804 A | * | 9/1999 | Kusase et al. | 310/59 |
| 6,075,302 A | * | 6/2000 | McCleer | 310/166 |
| 6,153,993 A | * | 11/2000 | Oomura et al. | 318/434 |
| 6,285,103 B1 | * | 9/2001 | Fukada | 310/152 |
| 6,342,476 B1 | * | 1/2002 | Konfino et al. | 514/2 |
| 6,342,746 B1 | * | 1/2002 | Flynn | 310/181 |
| 6,441,580 B2 | * | 8/2002 | Marcinkiewicz | 318/727 |

FOREIGN PATENT DOCUMENTS

WO  WO01/015304  * 8/2000  ........... H02K/9/10

* cited by examiner

Primary Examiner—Burton S. Mullins
Assistant Examiner—Heba Elkassabgi
(74) Attorney, Agent, or Firm—Rothwell, Figg, Ernst & Manbeck P.C.

(57) ABSTRACT

Disclosed is a brushless generator with permanent magnets, which provides high-speed operation, simple maintenance, lightweight, and stable power. The brushless generator with permanent magnets including a main generator with a stator and a rotor; and an auxiliary generator having a stator made of a hollow stator core and a coil wound around the stator core, and a rotor made of a rotor core rotating within the stator core and a coil wound around the rotor core, where wedges and grooves are formed alternatively on the inner portion of the stator core of the auxiliary generator, and permanent magnets are embedded in the body of the grooves and the coil is wound around the body of the grooves. Accordingly, without the use of a brush, a rated load voltage is generated from the permanent magnets of the auxiliary generator, and voltage variations due to load variations are controlled by the windings of the auxiliary generator. Therefore, along with reduction in capacity of controller, high-speed operation and highly efficient operation become possible, small size and lightweight can be obtained, and maintenance can be simpler.

6 Claims, 13 Drawing Sheets

Fig. 1

PRIOR ART

Fig. 2

PRIOR ART

BRUSHLESS GENERATOR WITH PERMANENT MAGNETS

BACKGROUND OF INVENTION

1. Field of the Invention

Figure 1:
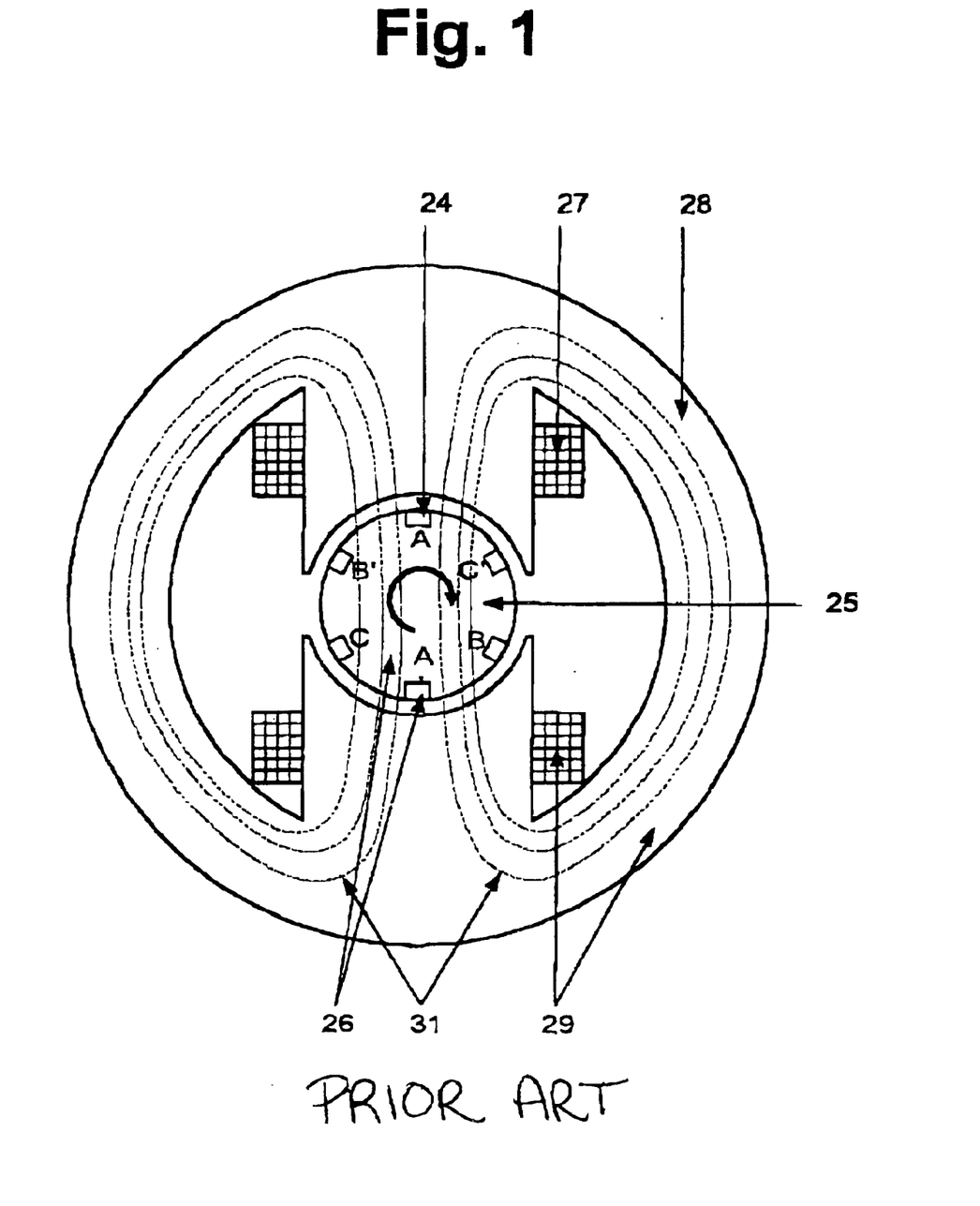
FIG. 1 is a conceptual diagram of an AC exciter in a conventional brushless generator.

The present invention relates to a brushless generator with permanent magnets. It specifically relates to a kind of brushless generator that, after generating and rectifying voltage using permanent magnets and windings of an auxiliary generator, it supplies current to an exciter of a main generator, and hence, generates electricity, 2. Description of the Related Art FIG. 1 is a conceptual diagram of an exciter of a conventional brushless generator and is a drawing regarding an AC (alternating Current) exciter. The AC exciter is comprised of an armature 26, which is made of armature windings 24 and an armature magnetic core 25, and a field system 29, which is made of a field winding 27 and a field magnetic core 28.

In the conventional AC exciter comprised of as described above, field magnetic flux 31 is generated from the static field system 29, and when the armature 26 rotates, voltage gets induced into the rotating armature windings 24 because magnetic flux interlinkage from the armature windings 24 changes periodically.

Figure 2:
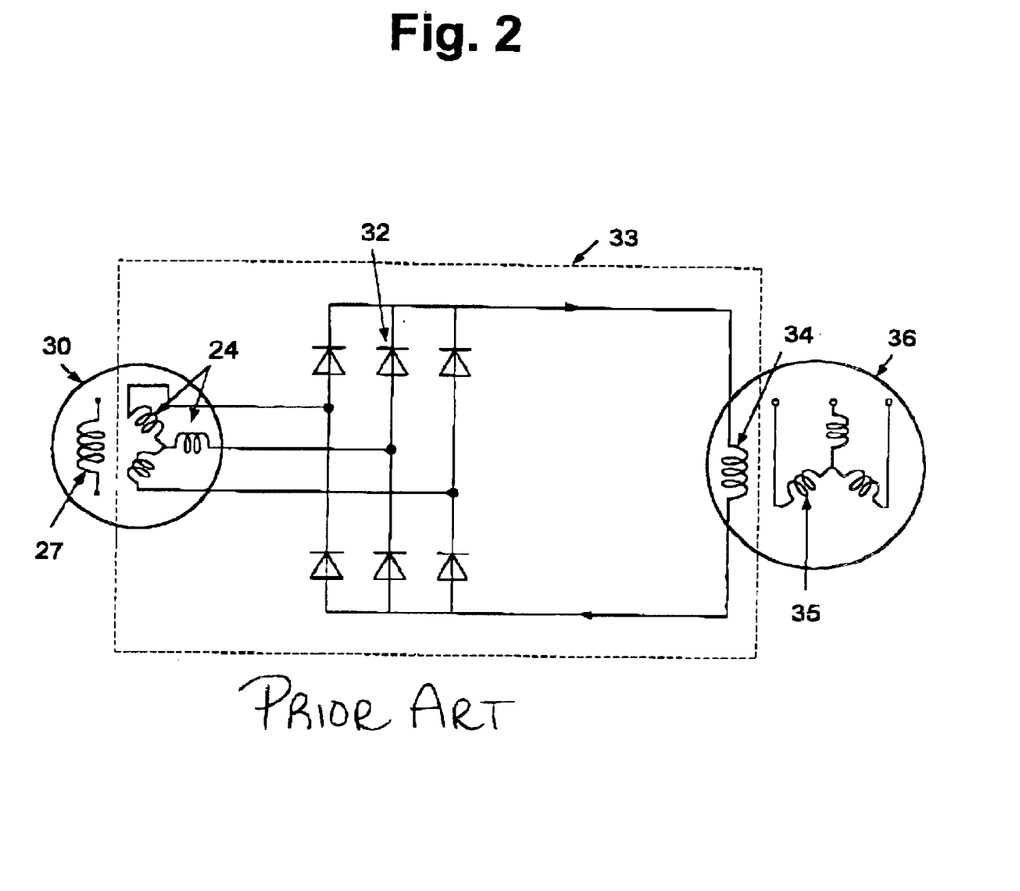
FIG. 2 is a circuit diagram of the conventional brushless generator.

FIG. 2 is a circuit diagram of the conventional brushless generator with the AC exciter comprised of as described above. As shown in FIG. 2, the generator is comprised of an AC exciter 30, which is made of the armature windings 24 and the field winding 27, semiconductor rectifiers 32, which is connected to each terminal of the armature windings 24, and a main generator 36, which is made of a field winding 34 and armature windings 35. Unexplained reference numeral 33 represents a rotor that is comprised of an armature 26 of the AC exciter 30, semiconductor rectifiers 32, and a field winding 34 of the main generator.

According to FIGS. 1 and 2, if the field magnetic flux 31 is generated from the field system 29 and the rotor 33 is rotated, then voltage gets induced in the armature windings 24 of the rotating AC exciter 30. After the induced voltage is converted into direct current (DC) via the semiconductor rectifiers 32, the direct current is supplied to the field winding 34 of the main generator 36. Therefore, the voltage gets induced in the stationary armature windings 35 of the main generator 36. As a result, it is possible to generate electricity without a brush.

However, the conventional brushless generator as described above has a disadvantage of the large capacity of a power supply device that supplies power to the field winding 27, because the field magnetic flux 31 is generated from the field system 29 of the AC exciter. Also, the conventional brushless generator has another disadvantage that is its inability of self-generation of electricity, and it is because it needs external power when the generator is re-operating from a suspension state.

Especially, in the case where there exists a need for lightweight of a generator and a power supply without external power source but with only mechanical power, such as in airplanes, cargo planes and etc, the difficulty arises with the conventional brushless generator.

SUMMARY OF THE INVENTION

Therefore, the present invention has been made in view of the above-described problems, and an object of the invention is to provide a brushless generator with permanent magnets that provide high-speed operation, simple maintenance, lightweight, and stable power.

In accordance with one aspect, the present invention provides a brushless generator with permanent magnets comprising: a main generator with a stator and a rotor; and an auxiliary generator with a stator made of a hollow stator core and a coil wound around the stator core, and a rotor made of a rotor core rotating within the stator core and a coil wound around the rotor core, wherein wedges and grooves are formed in alternation on the inner portion of the stator core of the auxiliary generator, and permanent magnets are embedded in the body of the grooves and the coil is wound around the body of the grooves.

BRIEF DESCRIPTION OF THE DRAWINGS

The above object, as well as other features and advantages of the present invention will become more apparent after a overview of the following detailed description which will be taken in conjunction with the drawings. The descriptions are as follows.

Now, a brushless generator with permanent magnets according to a preferable embodiment of the present invention will be described in conjunction with FIGS. 3 to 11.

Figure 3:
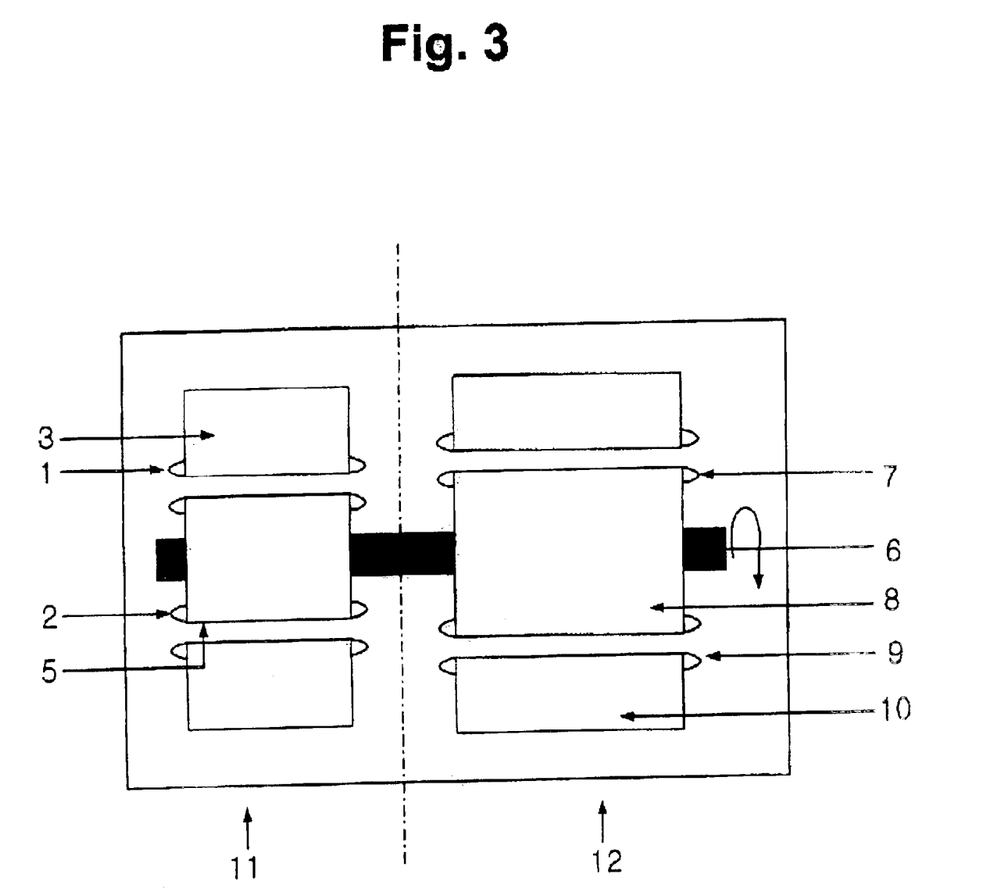
FIG. 3 is a configuration diagram of a brushless generator with permanent magnets according to a preferable embodiment of the present invention.

FIG. 3 is a configuration diagram of the brushless generator with permanent magnets according to the preferable embodiment of the present invention. As shown in FIG. 3, the brushless generator includes a main generator 12 that generates desired power, and an auxiliary generator II that supplies power to the main generator 12.

The main generator 12 is comprised of a main generator's stator made of a main generator's hollow stator core 10 and a main generator's stator windings 9 wound around the main generator's stator core 10; and a main generator's rotor made of a main generator's rotor core 8, where the rotation axis 6 of a desired length is tightly inserted in so that it penetrates in the horizontal direction and it rotates in the inside of the main generator's stator core 10, and a main generator's rotor windings 7, which is wound around the main generator's rotor core 8.

The auxiliary generator 11 is directly connected to the rotation axis 6 that is tightly inserted in the rotor core 8 of the main generator 12. The auxiliary generator 11 is comprised of an auxiliary generator's stator which is made of an auxiliary generator's hollow stator core 3, and an auxiliary generator's stator windings 1 which is wound around the auxiliary generator's stator core 3; and an auxiliary generator's rotor which is made of an auxiliary generator's rotor core 5 where the rotation axis 6 is tightly inserted in so that it penetrates in the horizontal direction and it rotates in the inside of the auxiliary generator's stator core 3, and an auxiliary generator's rotor windings 2 which is wound around the auxiliary generator's rotor core 5.

Figure 4:
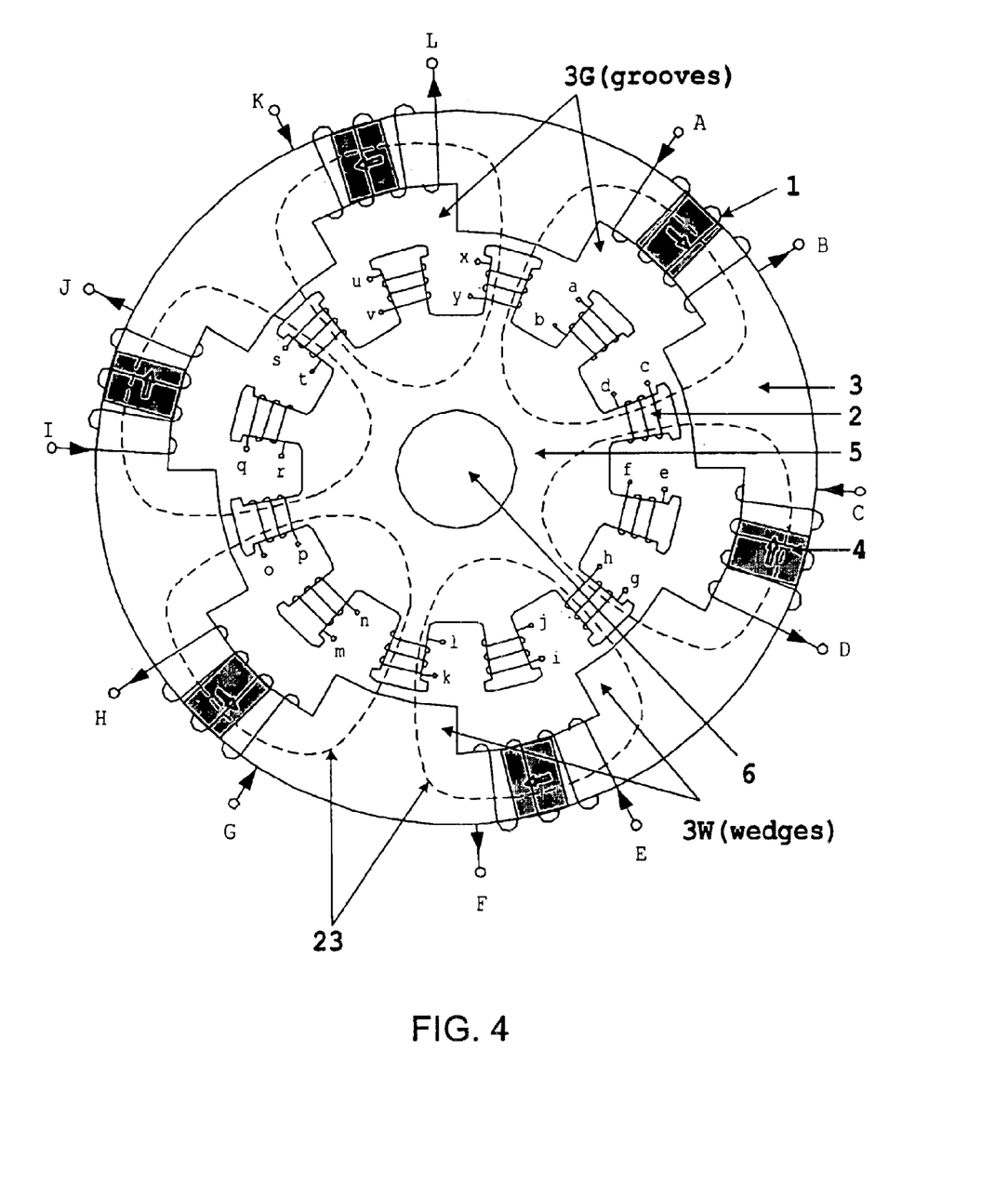
FIG. 4 is a detail diagram of a stator and a rotor of an auxiliary generator illustrated in FIG. 3.

In reference to FIG. 4, more detailed description of the auxiliary generator 11 is to be made here. The auxiliary generator's stator core 3 is cylindrical, and in the inner side of the same, wedges and grooves are formed alternatively. Moreover, permanent magnets 4 are embedded in the body of the grooves and the auxiliary generator's stator winding 1 is wound around the body of the grooves. In the case of the preferable embodiment of the present invention, six wedges and six grooves are formed in the inner side of the auxiliary generator's stator core 3.

In addition, the cross section of the body of the auxiliary generator's rotor core 5, which is rotating within the auxiliary generator's stator core 3, is a ring shape, while on the outer perimeter of the ring-shape body of the same, protuberances of an equal length, are projected in equal space toward the inner side of the auxiliary generator's stator core 3. Moreover, in the case of the preferable embodiment of the present invention, there are 12 protuberances of the auxiliary generator's rotor core 5, and the auxiliary generator's rotor windings 2 are wound around the protuberances of the auxiliary generator's rotor core 5. In FIG. 4, an unexplained reference numeral 23 is the main magnetic flux generated in the auxiliary generator.

The main magnetic flux 23 in the auxiliary generator is generated by the permanent magnets 4 and the electromotive force (EMF) gets induced into the rotating auxiliary generator's rotor windings 2, due to the main magnetic flux 23. Therefore, under a rated speed, a rated output voltage of the generator can be generated by the permanent magnets 4.

Output voltage due to the generator's output load variation is controlled by the current that flows through the stator windings 1 of the auxiliary generator. Moreover, a output voltage controller 19, which will be described later on with reference to FIG. 11, controls the output voltage that will be maintained at a certain level and it will be achieved by increasing the flow of current into the stator windings 1 of the auxiliary generator, if there exists voltage shortage.

The brushless generator, in accordance with the preferable embodiment of the present invention, is comprised of the main generator 12 and the auxiliary generator 11. The main magnetic flux 23 of the auxiliary generator 11 is generated in the stator core 3 and the rotor core 5 due to the current that comes from the stator windings 1 of the auxiliary generator 11 and the permanent magnets 4 of the auxiliary generator 11. At this moment, if the rotation axis 6 is rotated, then electromotive force gets induced into the auxiliary generator's rotor windings 2.

The induced electromotive force is rectified and the rectified current is supplied to the main generator' rotor windings 7. Therefore, the current of the main generator's rotor windings 7 forms the magnetic flux in the main generator's stator core 10 and the main generator's rotor core 8. Due to the magnetic flux, a desired amount of output voltage is obtained in the main generator's stator windings 9.

Figure 5:
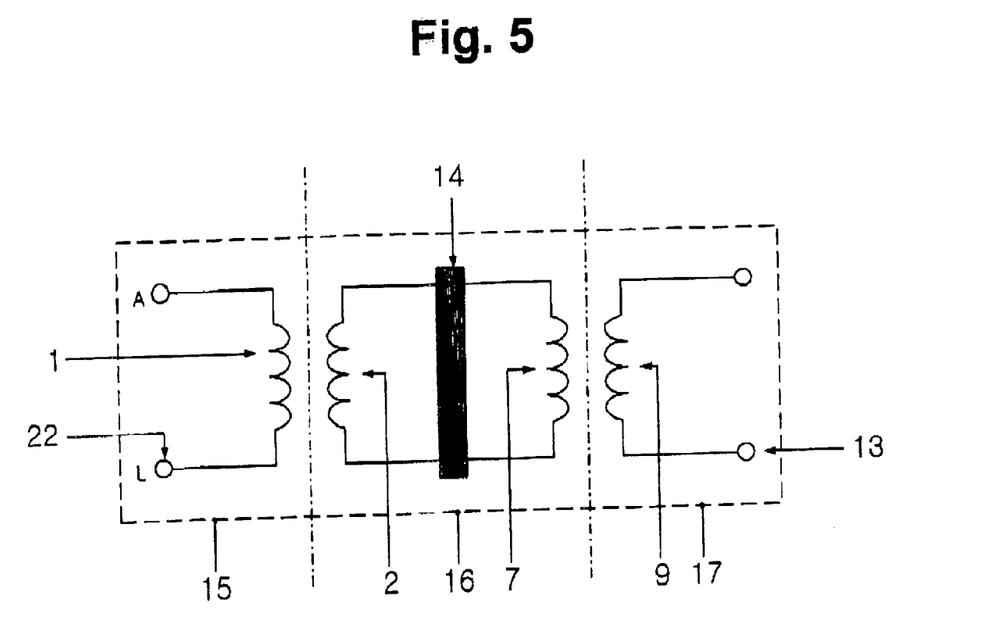
FIG. 5 is a circuit diagram of the brushless generator with permanent magnets according to the preferable embodiment of the present invention.

FIG. 5 is a circuit diagram of the brushless generator with permanent magnets according to the preferable embodiment of the present invention. As illustrated in FIG. 5, the brushless generator of the present invention is comprised of an auxiliary generator's stator 15 which is made of the auxiliary generator's windings 1 connected to auxiliary generator's stator input terminals 22, a rotor 16 which is equipped with the auxiliary generator's rotor windings 2 and the main generator's rotor windings 7, wherein a rectifier 14 connected in between the windings 2 and the windings 7, and a main generator's stator 17 with the main generator's stator windings 9 connected to main generator's output terminals 13.

The rectifier 14 rectifies electromotive force that is induced into the auxiliary generator's rotor windings 2 and supplies direct current into an exciter of the main generator.

In FIG. 5, when a desired amount of power is inputted into the auxiliary generator's stator input terminal 22, electromotive force is induced into the auxliary generator's rotor windings 2. The induced electromotive force is rectified by the rectifier 14, and than the rectified current gets supplied to the main generator's rotor winding 7. Therefore, the magnetic flux is formed in the main generator's stator core 10 and the main generator's rotor core 8. Due to the magnetic flux, a desired amount of output voltage is obtained in the main generator's stator winding 9, transmitted into the main generator's output terminal 13.

Figure 6A:
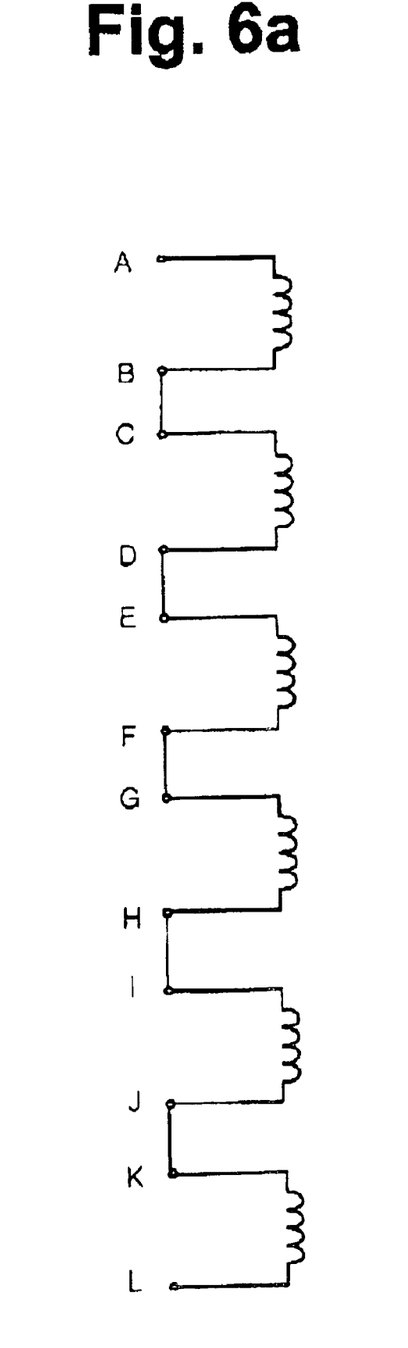
FIGS. 6a and 6b are input power connection diagrams of the auxiliary generator according to the preferable embodiment of the present invention.
Figure 6B:
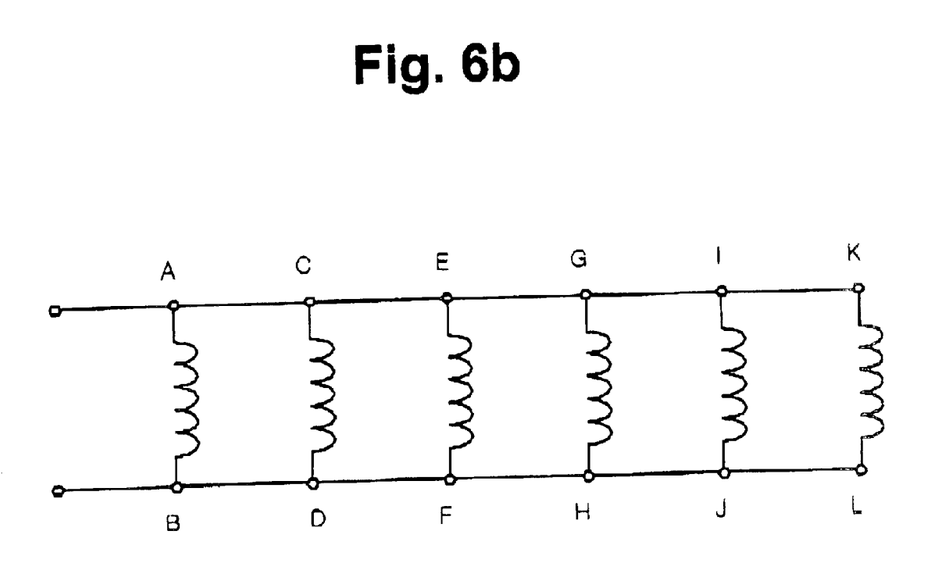

FIGS. 6a and 6b are the input power connection diagrams of an auxiliary generator according to the preferable embodiment of the present invention. When high voltage and low current is applied to the auxiliary generator's stator windings 1, the auxiliary generator's stator windings 1 (A~L) are used in series connection as shown in FIG. 6a. Also, when low voltage and high current is applied to the auxiliary generator's stator windings 1, the auxiliary generator's stator windings 1 (A~L) are used in parallel connection as shown in FIG. 6b.

Figure 7A:
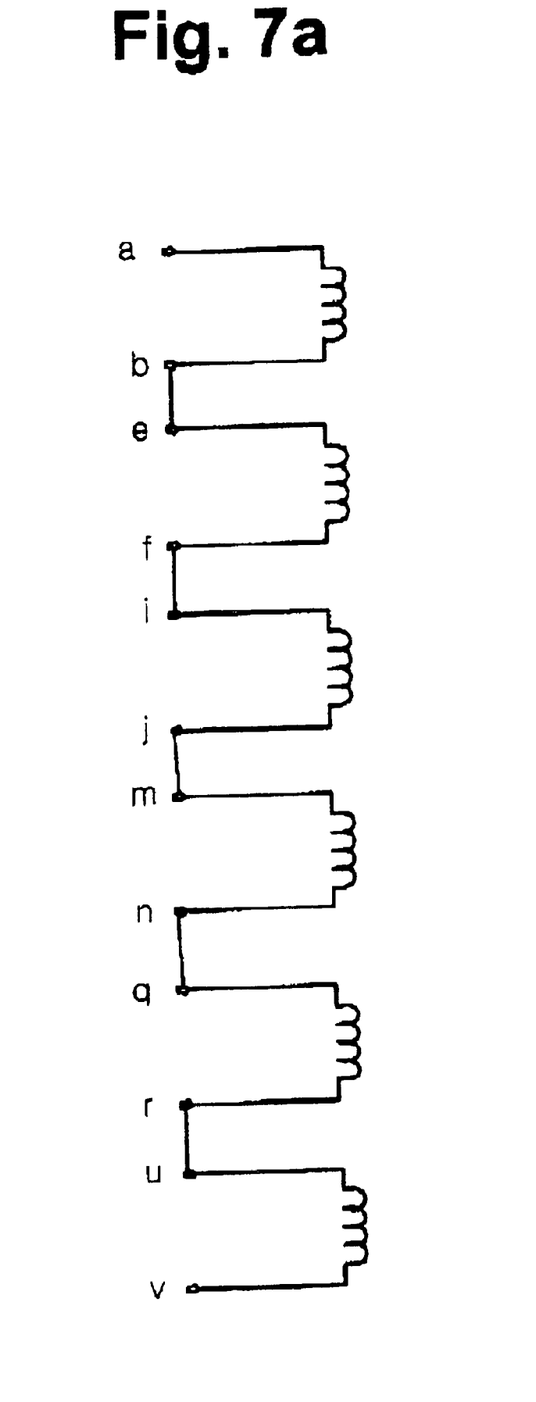
FIGS. 7a and 7b are A-phase output connection diagrams of the auxiliary generator according to the preferable embodiment of the present invention.
Figure 7B:
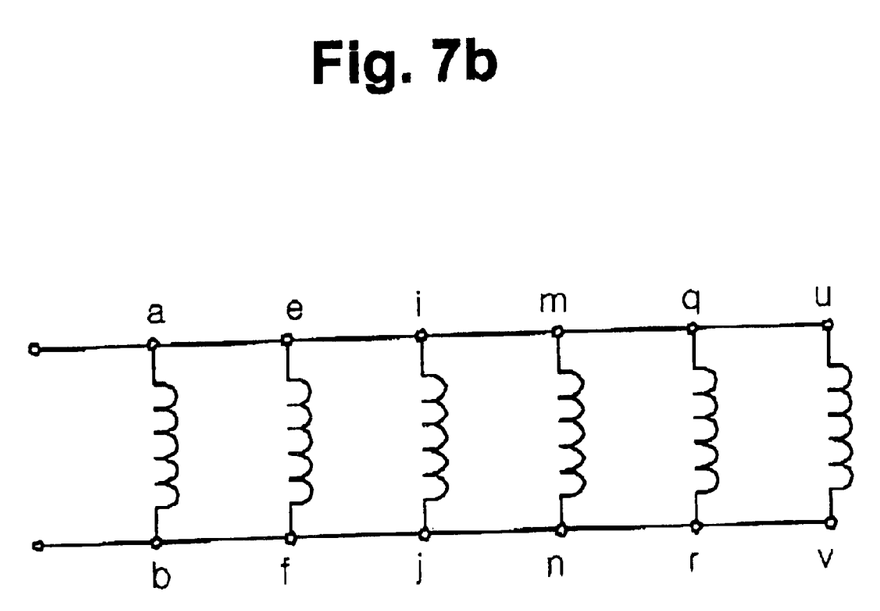
Figure 8A:
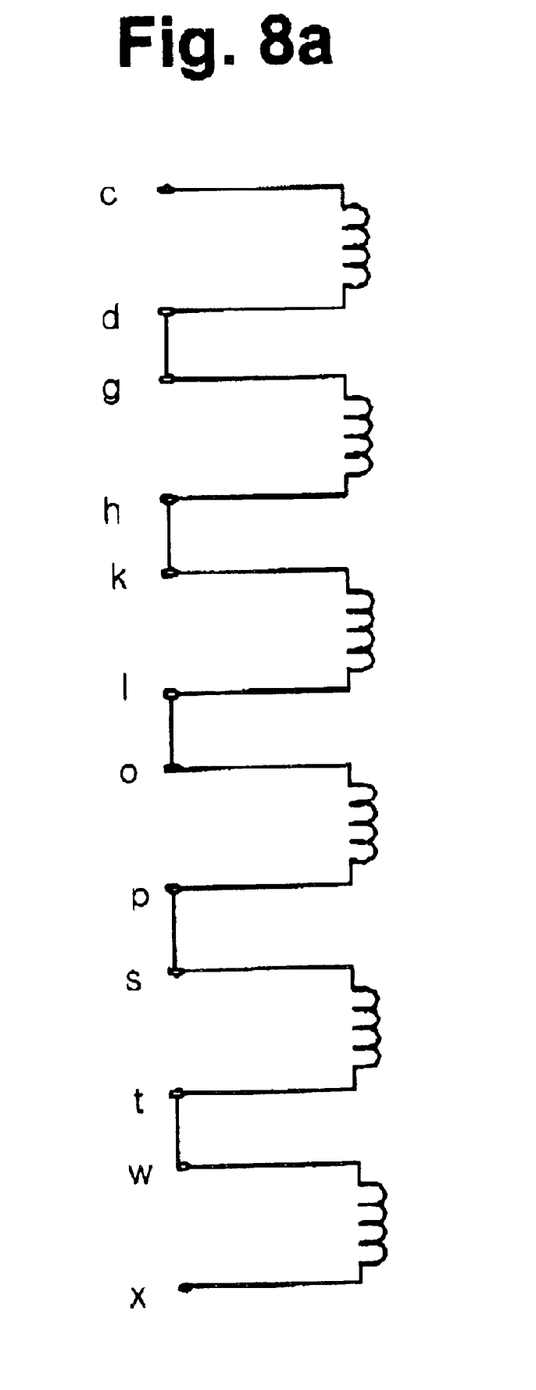
FIGS. 8a and 8b are B-phase output connection diagrams of the auxiliary generator according to the preferable embodiment of the present invention.
Figure 8B:
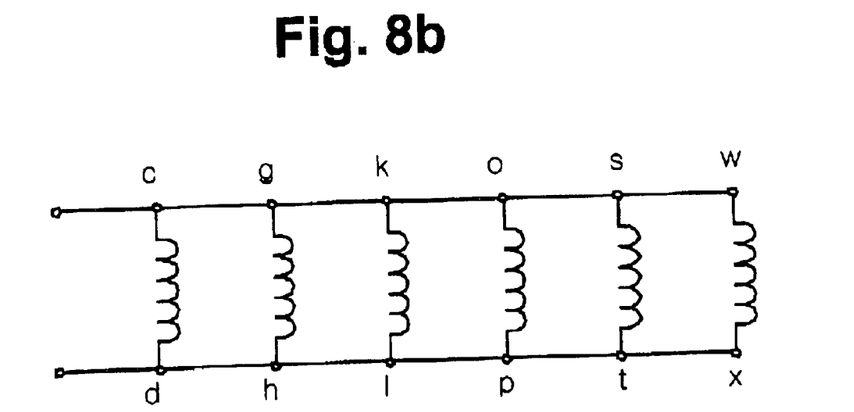

FIGS. 7a and 7b are the A-phase output connection diagrams of the auxiliary generator according to the preferable embodiment of the present invention, and FIGS. 8a and 8b are the B-phase output connection diagrams of the auxiliary generator according to the preferable embodiment of the present invention. Electrically, the A-phase output of the auxiliary generator has 90 degrees of phase difference from the B-phase output of the auxiliary generator.

When high voltage and low current is applied to the auxiliary generator's rotor windings 2, the auxiliary generator's rotor windings 2 are used in series connection as shown in FIGS. 7a and 7a. Also, when low voltage and high current is applied to the auxiliary generator's rotor windings 2, the auxiliary generator's stator windings 2 are used in parallel connection as shown in FIGS. 7b and 8b.

Figure 9:
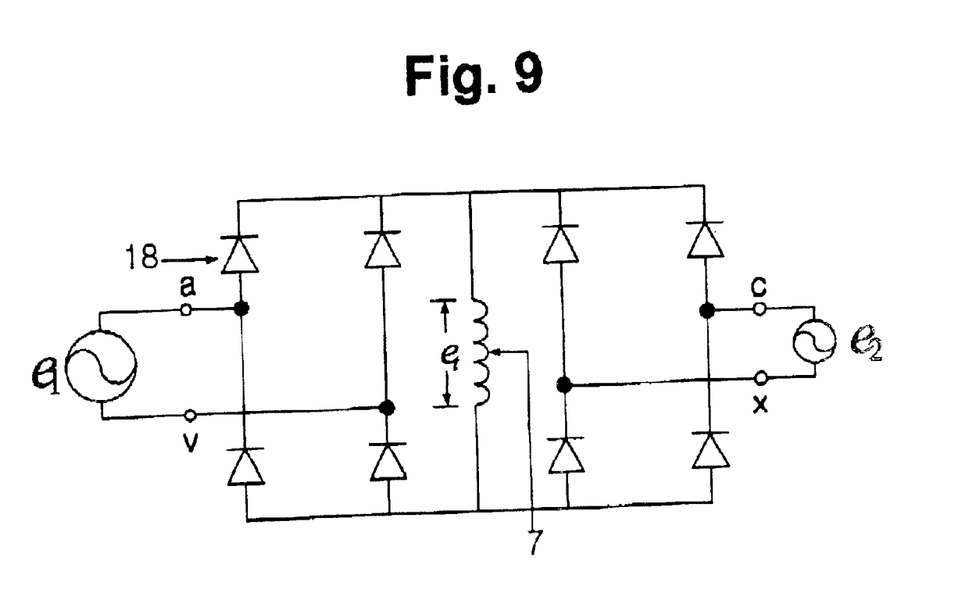
FIG. 9 is an output rectifier circuit diagram of the auxiliary generator according to the preferable embodiment of the present invention.
Figure 10:
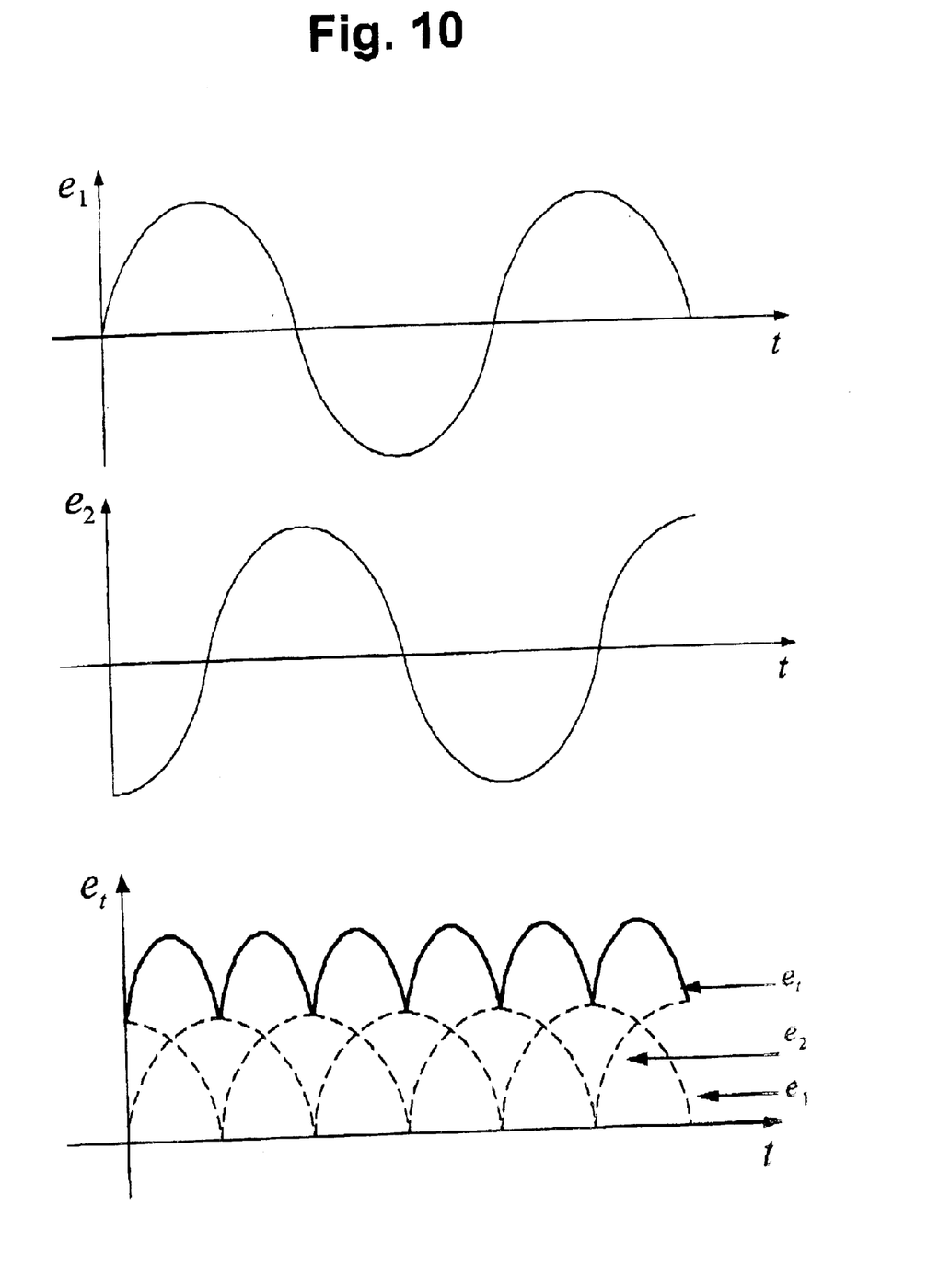
FIG. 10 is voltage waveforms of the rectifier circuit of the auxiliary generator according to the preferable embodiment of the present invention.

FIG. 9 is an output rectifier circuit diagram of the auxiliary generator according to the preferable embodiment of the present invention, and FIG. 10 is voltage waveforms of rectifier circuit of the auxiliary generator according to the preferable embodiment of the present invention.

Terminals c~x or c~d, which have 90 degrees phase difference from terminals a~v or a~b of the auxiliary generator's rotor windings 2 get connected to the main generator's rotor windings 7 through rectifier diodes 18.

If terminal voltage e1 applied to the terminals a~v or a~b of the auxiliary generator's rotor windings 2, and terminal voltage e2 applied to the terminals c~x or c~d of the auxiliary generator's rotor windings 2 are as shown in FIG. 10, then the terminal voltage e1 induced into the main generator's rotor windings 7 becomes the resultant voltage which is composed of the rectified voltages of the terminal voltages e1 and e2, as shown in FIG. 10.

Figure 11:
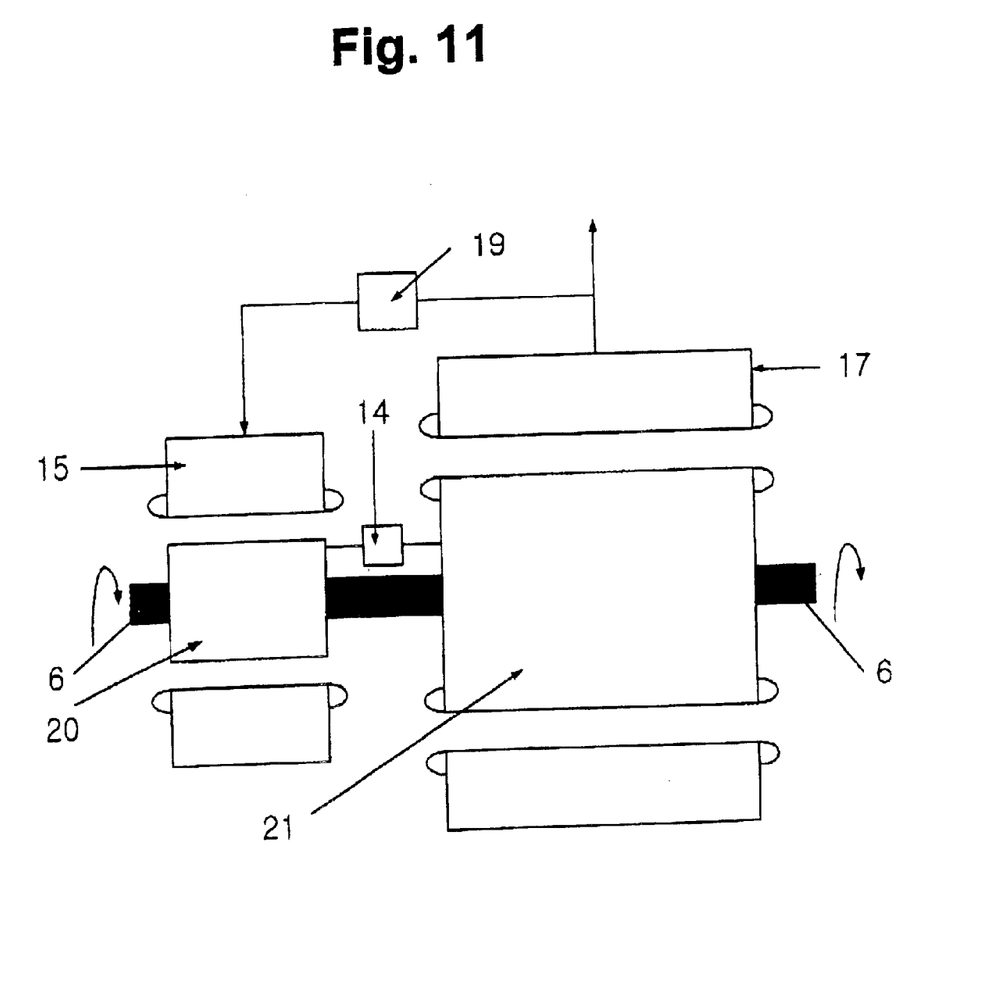
FIG. 11 is a circuit diagram for controlling output voltage of the brushless generator with permanent magnets according to the preferable embodiment of the present invention.

FIG. 11 is a circuit diagram for controlling output voltage of the brushless generator with permanent magnets according to the preferable embodiment of the present invention. The rotation axis 6 of a desired length is tightly inserted into an auxiliary generator's rotor 20 and a main generator's rotor 21. The auxiliary generator's rotor 20 rotates in the inside of the auxiliary generator's stator 15 while the main generator's rotor 21 rotates in the inside of the main generator's stator 17.

Moreover, the rectifier 14 is connected in between the auxiliary generator's rotor 20 and the main generator's rotor 21, and an output voltage controller 19 is connected in between the auxiliary generator's stator 15 and the main generator's stator 17.

Therefore, if the rotation axis 6 is rotated by the auxiliary generator, then electromotive force gets induced into the rotor windings of the auxiliary generator, and the induced electromotive force gets rectified by the rectifier 14, and then the rectified current gets supplied into the exciter of the main generator.

Next, a desired amount of voltage is outputted from the main generator. The output voltage controller 19 measures the output voltage of the main generator to control current of the stator windings 1 of the auxiliary generator.

According to the present invention as described above in detail, without the use of a brush, a rated load voltage is generated from the permanent magnets of the auxiliary generator and a voltage variations due to load variations are controlled by the stator windings of the auxiliary generator. Therefore, along with reduction in capacity of controller, high-speed operation and highly efficient operation become possible, small size and lightweight can be obtained, and maintenance becomes simpler.

Especially, the controller of the brushless generator of the present invention is smaller than that of the convention brushless generator. Also, since field magnetic flux always exists due to the permanent magnets, power can be generated at all time if torque is applied to the brushless generator of this present invention. Therefore, the brushless generator of the present invention is suitable for power supply in an airplane.

Although the preferred embodiment of the present invention have been disclosed for illustrative purposes, those skilled in the art will appreciate that various modifications, additions and substitutions become possible, while can be avoided departing from the scope and spirit of the invention as disclosed in the accompanying claims.

What is claimed is:

1. A brushless generator with permanent magnets comprising:

a main generator with a stator and a rotor; and a auxillary generator, which has a stator made of a hollow stator core and a coil wound around the stator core, and a rotor made of a rotor core rotating within the stator core and a coil would around the rotor core, wherein wedges and groves are formed alternatively on the inner portion of the stator core of the auxiliary generator, while permanent magnets are embedded in the body of the grooves and the coil is wound around the body of the same grooves.

2. The brushless generator with permanent magnets according to claim 1, wherein the rotor of said auxiliary generator and the rotor of said main generator are directly connected to each other by a rotating axis that penetrates them.

3. The brushless generator with permanent magnets according to claim 1 further comprising an output voltage controller, which is placed in between the stator of said main generator and the stator of said auxiliary generator, in order to measure the output voltage of said main generator and control current of the coil wound around the stator core of said auxiliary generator on the basis of the measured output voltage.

4. The brushless generator with permanent magnets according to claim 1 further comprising a rectifier, which is placed in between the rotor of said main generator and the rotor of said auxiliary generator, in order to rectify electromotive force induced into the rotor of said auxiliary generator and, to supply the rectified electromotive force into the rotor of said main generator.

5. The brushless generator with permanent magnets according to claim 1, wherein A-phase output voltage and B-phase output voltage of the coil would around the rotor core of said auxiliary generator have a phase difference of 90 degrees each other, and the rectified resultant voltage of said A-phase output voltage and said B-phase output voltage gets induced into the rotor of said main generator.

6. The brushless generator with permanent magnets according to claim 1, wherein a cross-section of the auxiliary generator's rotor core is generally ring-shaped and includes protuberances around an outer perimeter and wherein the coil wound around the rotor core includes winding around the protuberances.

* * * * *

UNITED STATES PATENT AND TRADEMARK OFFICE
CERTIFICATE OF CORRECTION

PATENT NO. : 6,864,608 B2  Page 1 of 1
DATED : March 8, 2005
INVENTOR(S) : Do Hyun Kang and Yeon Ho Jeong It is certified that error appears in the above-identified patent and that said Letters Patent is hereby corrected as shown below:

<u>Title page,</u>
Item [30], Foreign Application Priority Data, add -- 01-46241 Republic of Korea July 31, 2001 --

Signed and Sealed this

Twenty-eighth Day of June, 2005

JON W. DUDAS
*Director of the United States Patent and Trademark Office*